(12) United States Patent
Takano et al.

(10) Patent No.: US 6,351,437 B1
(45) Date of Patent: Feb. 26, 2002

(54) TRACKING SERVO CIRCUIT

(75) Inventors: Koji Takano, Ogaki; Fumiaki Nagao, Gifu-ken, both of (JP)

(73) Assignee: Sanyo Electric Co., Ltd. (JP)

( * ) Notice: Subject to any disclaimer, the term of this patent is extended or adjusted under 35 U.S.C. 154(b) by 0 days.

(21) Appl. No.: 09/440,416

(22) Filed: Nov. 15, 1999

(30) Foreign Application Priority Data

Nov. 17, 1998 (JP) ............................................. 10-327043
Nov. 17, 1998 (JP) ............................................. 10-327154

(51) Int. Cl.⁷ ................................................. G11B 7/09
(52) U.S. Cl. ............................... 369/44.29; 369/44.32; 369/44.35
(58) Field of Search ........................... 369/44.27, 44.28, 369/44.29, 44.32, 44.35, 44.34, 44.41, 32, 47.1, 124.01, 124.15

(56) References Cited

U.S. PATENT DOCUMENTS 4,598,394 A * 7/1986 Nonaka ........................ 369/32
4,866,687 A * 9/1989 Kasai et al. ................... 369/32
5,351,223 A * 9/1994 Park ........................ 369/44.28

* cited by examiner

Primary Examiner—Muhammad Edun
(74) Attorney, Agent, or Firm—Fish & Richardson P.C.

(57) ABSTRACT

A tracking servo circuit for stopping movement of a pickup device at a target position on a recording track of a recording medium, such as a CD, includes an A/D converter that generates error data from a tracking signal. The tracking error signal has a positive value when the pickup device is located at a first side of the recording track and a negative value when the pickup device is located on the opposite side of the recording track. The error data includes a code bit indicating the polarity of the tracking signal. A selector control circuit generates a selection signal using the code bit. A selector connected to the A/D converter and the selector control circuit selects either the error data or a fixed data value based on the selection signal. A drive signal generator receives the selected data and generates a drive signal to stop the radial movement of the pickup device.

29 Claims, 6 Drawing Sheets

TRACKING SERVO CIRCUIT

BACKGROUND OF THE INVENTION

The present invention relates to a tracking servo circuit, and more particularly, to a tracking servo circuit for controlling the movement of a pickup device relative to a disk type recording medium.

A compact disc (CD) is mainly used as a digital audio recording medium, but it can also be used as a read only memory (CD-ROM) for storing various types of digital data read by computers.

FIG. 1 is a schematic block diagram showing a conventional disk reproduction apparatus. A disc 1 has a spiral recording track formed on at least one of its surfaces. Digital data, which is in a predetermined format, is recorded along the recording track. The disc reproduction apparatus includes a pickup 3 to read the data recorded on the recording track. The disc reproduction apparatus further includes a servo mechanism for controlling the position of the pickup 3 relative to the disc 1 so that the pickup 3 traces the recording track properly.

As shown in FIG. 2, digital data is recorded as a plurality of pits (bumps) that are formed on the recording track of the disc 1. The digital data undergoes EFM modulation to generate an EFM signal. The pits are formed having a predetermined dimension in correspondence with the EFM signal. The disc 1 is rotated by a spindle motor 2. The spindle motor 2 rotates the disc 1 at a predetermined speed in accordance with a drive signal SD generated by a servo controller 6.

The pickup 3 is arranged opposite the recording track of the disc 1. An actuator 4, which is operated in accordance with a drive signal TD, moves the pickup 3 in the radial direction of the disc 1. The pickup 3 includes laser beam sources and sensors. As shown in FIG. 2, the pickup 3 generates a main reading beam P and a pair of auxiliary reading beams T1, T2 which are radiated toward the recording track. The main reading beam P is used to detect pits on the recording track surface. The auxiliary reading beams T1, T2 are used to detect when the pickup 3 moves away from the recording track. The reading beams P, T1, T2 radiated against the pits of the disc 1 are reflected toward the sensor as weak lights. The reading beams P, T1, T2 radiated against portions other than the pits of the disc 1 are reflected toward the sensor as strong lights. When the sensor associated with each of the reading beams P, T1, T2 receives the corresponding reflection beam, the sensor generates a voltage having a value which corresponds to the intensity of the reflected light.

A voltage signal having a value corresponding to the main reading beam P is sent to a signal processor 5 from the pickup 3. The signal processor 5 conducts a waveform shaping process and a binarizing process on the voltage signal to generate an EFM signal. The EFM signal repetitively goes back and forth between a low level and a high level in accordance with the existence of pits.

The signal processor 5 generates a tracking error signal TE from the difference between the voltage values of the auxiliary reading beams T1, T2 and an off track signal OT from a low frequency component of the EFM signal. The voltage value corresponding to the auxiliary reading beam T1 is substantially the same as the voltage value corresponding to the auxiliary reading beam T2 when the pickup 3 is accurately tracking the recording track (i.e., when the pickup 3 is at the proper position). Under these conditions, the tracking error signal TE is maintained at a null level. When the pickup 3 is not accurately tracking the recording track (i.e., when the pickup 3 is not at the proper position), for example, when the position of the pickup 3 is offset inward from the recording track, the voltage value corresponding to the auxiliary reading beam T1 becomes smaller than the voltage value corresponding to the auxiliary reading beam T2 and causes the tracking error signal TE to take a negative value. On the other hand, if the position of the pickup 3 is offset outward from the recording track, the voltage value corresponding to the auxiliary reading beam T2 becomes smaller than the voltage value corresponding to the auxiliary reading beam T1 and causes the tracking error signal TE to take a positive value. When the pickup 3 is properly tracking the recording track of the disc 1, the signal processor 5 continuously outputs the EFM signal. Thus, the EFM signal does not include a low frequency component. Accordingly, the off track signal OT is maintained at a low level when the pickup 3 is properly tracking the recording track.

As shown in FIG. 1, the signal processor 5 sends the tracking error signal TE and the off track signal OT together with the EFM signal to the servo controller 6. The servo controller 6 generates the spindle motor drive signal SD and the actuator drive signal TD based on the tracking error signal TE and the off track signal OT. The spindle motor drive signal SD controls the spindle motor 2 so that the frequency of the EFM signal is maintained at a predetermined value. The actuator drive signal TD controls the actuator 4 so that the tracking error signal TE has a null level and the off track signal OT is maintained at a low level. The spindle motor drive signal SD and the actuator drive signal TD servo control the spindle and tracking.

FIG. 3 is a chart showing the waveforms of the signals detected when the pickup 3 moves across the lines of the recording track on the disc 1 (when a so-called track jump is performed). The horizontal axis represents time. FIG. 3 shows a state in which the pickup 3 gradually decelerates.

As shown in FIG. 3, the code (polarity) of the pickup 3 is inverted each time the pickup 3 moves across the recording track. Thus, the waveform of the tracking error signal TE is a sine wave during the track jump. A track jump signal TJ is generated by digitizing the tracking error signal TE using a null level of the tracking error signal TE as a threshold value. The track jump signal TJ falls or rises when the center of the pickup 3 is located at the center of the recording track. Furthermore, the EFM signal has a predetermined amplitude when the pickup 3 is located above the recording track. If the pickup 3 moves away from the recording track, the EFM signal maintains a. constant value. Accordingly, the off track signal OT rises or falls when the center of the pickup 3 reaches an end of a pit. Normally, the phase difference between the off track signal OT and the tracking error signal TE is ±90°. Accordingly, the number of times the pickup 3 crosses the recording track is detected by counting the tracking error signals TE or the off track signals OT. The moving direction of the pickup 3 is detected from the difference between the phase of the tracking error signal TE and the phase of the off track signal OT. The movement of the pickup 3 is controlled based on the two detection results.

When moving the pickup 3 in the radial direction of the disc 1, the pickup 3 is accelerated when the movement starts. When stopping the pickup 3 at a target position, the pickup 3 is decelerated just before reaching the target position. The acceleration and deceleration of the pickup 3 are controlled by the drive signal TD. Normally, to control the stopping of the pickup 3, a tracking error signal TE having a positive polarity or a negative polarity is acquired. An electromotive force acting in a direction opposite the moving direction of the pickup 3 is applied to the pickup 3 in accordance with the value of the acquired tracking error signal TE. For example, if the pickup 3 moves in an outward direction of the disc 1 and the track jump signal TJ is high, a tracking error signal TE having a positive polarity is acquired and a counter electromotive force, or braking force, is applied to the pickup 3. When the pickup 3 moves toward the center of the disc 1 and the track jump signal TJ is low, a tracking error signal TE having a negative polarity is acquired.

When a difference occurs between the phase of the track jump signal TJ and the phase of the tracking error signal TE, the tracking error signal $TE_s$ acquired from the track jump signal TJ may not have a constant polarity (positive or negative). In this case, deceleration of the pickup 3 may be insufficient. For example, if the track jump signal TJ is delayed from the tracking error signal TE as shown in FIG. 4, the tracking error signal $TE_s$ acquired in response to the track jump signal TJ includes a negative polarity period. This accelerates the pickup 3 during the negative polarity period of the tracking error signal $TE_s$. As a result, the pickup 3 may not be able to stop at the target position, causing sliding to occur.

In addition, when the actuator 4 is manufactured, structural and dimensional differences may cause the actuator 4 to have an operational characteristic which differs from other actuators. Thus, if the drive signal TD is processed in the same manner as other actuators, the same operation may not be obtained.

SUMMARY OF THE INVENTION

Accordingly, it is an objective of the present invention to provide a tracking servo circuit that always accurately stops the pickup at a target position.

To achieve the above objective, the present invention provides a tracking servo circuit for stopping a pickup at a target position on a recording track formed on a recording medium. The tracking servo circuit includes a selection signal generator for generating a selection signal in accordance with the polarity of a tracking error signal. The tracking error signal has a positive value when the pickup is located at a first side of the recording track and a negative value when located at a second, opposite side of the recording track. A selector is connected to the selection signal generator. The selector selects one of two data in accordance with the selection signal and outputs the selected data. A drive signal generator is connected to the selector to generate a drive signal for stopping the radial movement of the pickup using the selected data.

A further aspect of the present invention provides a tracking servo circuit for stopping a pickup at a target position on a recording track formed on a recording medium. The tracking servo circuit includes an A/D converter for generating digitized error data from a tracking error signal. The tracking error signal takes a positive value when the pickup is located at a first side of the recording track and takes a negative value when located at a second, opposite side of the recording track. The error data includes a code bit indicating the polarity of the tracking signal. A selection signal generator generates a selection signal in accordance with the code bit. A selector is connected to the A/D converter and the selection signal generator to select one of the error data and a predetermined fixed data in accordance with the selection signal. A drive signal generator is connected to the selector to generate a drive signal for stopping the radial movement of the pickup using the data selected by the selector.

Another aspect of the present invention provides a tracking servo circuit for stopping a pickup at a target position on a recording track formed on a recording medium. The tracking servo circuit includes an A/D converter for generating digitized error data from a tracking error signal. The tracking error signal takes a positive value when the pickup is located at a first side of the recording track and takes a negative value when located at a second, opposite side of the recording track. The error data includes a code bit indicating the polarity of the tracking signal. A first multiplying device is connected to the A/D converter to receive the error data from the A/D converter, multiply the error data with a predetermined first coefficient, and generate a first product. A second multiplying device is connected to the A/D converter to receive the error data from the A/D converter, multiply the error data with a predetermined second coefficient, and generate a second product. A selection signal generator generates a selection signal in accordance with the code bit. A selector is connected to the first and second multiplying devices and the selection signal generator to select one of the first product and the second product in accordance with the selection signal. A drive signal generator is connected to the selector to generate a drive signal for stopping the radial movement of the pickup using the data selected by the selector.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
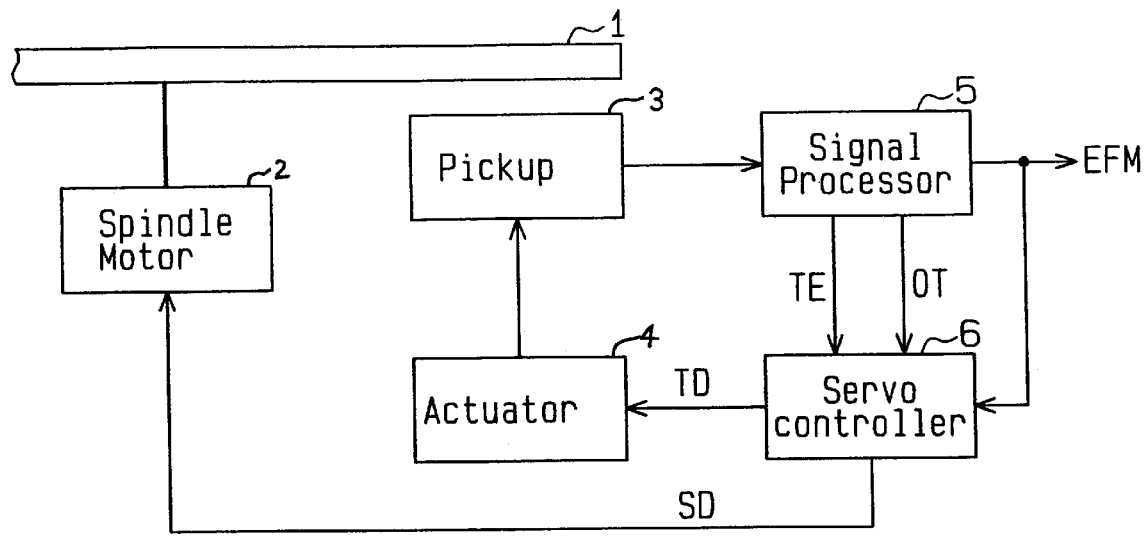
FIG. 1 is a block diagram showing the structure of a prior art disc reproduction apparatus.
Figure 2:
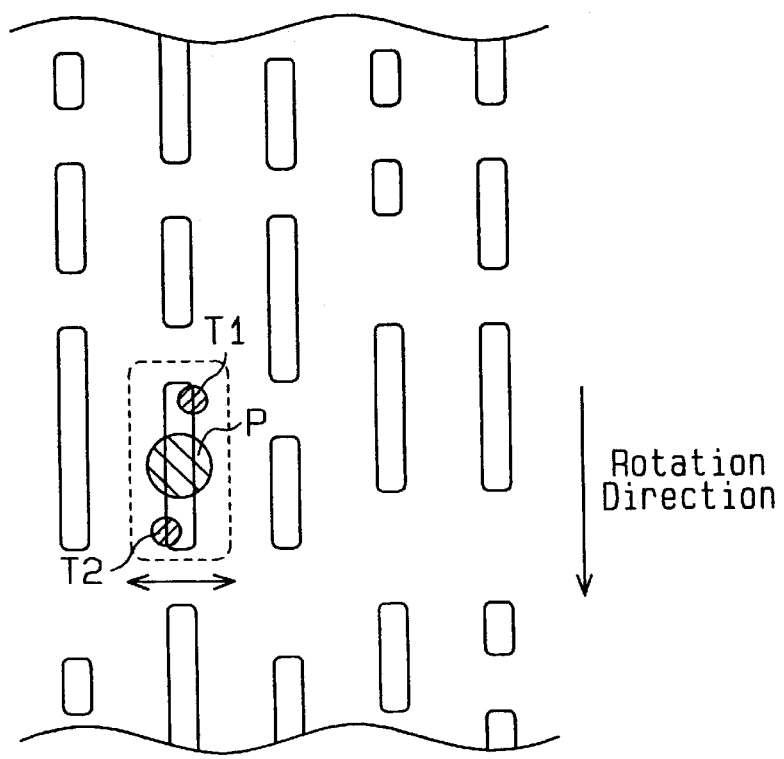
FIG. 2 is a plan view showing the structure of a recording track of a compact disc.
Figure 3:
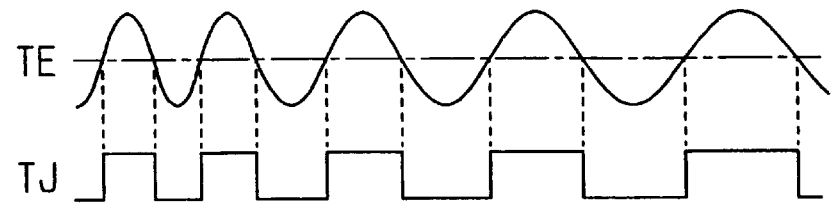
FIG. 3 is a chart showing the relationship between a tracking error signal and an off track signal.
Figure 3:
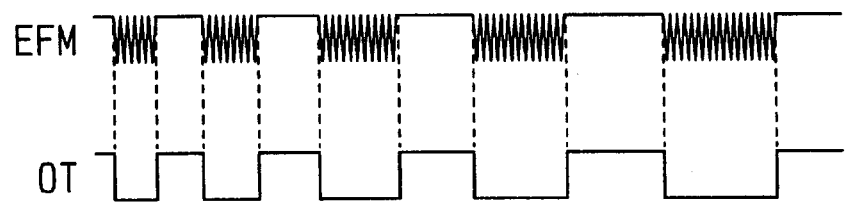
Figure 4:
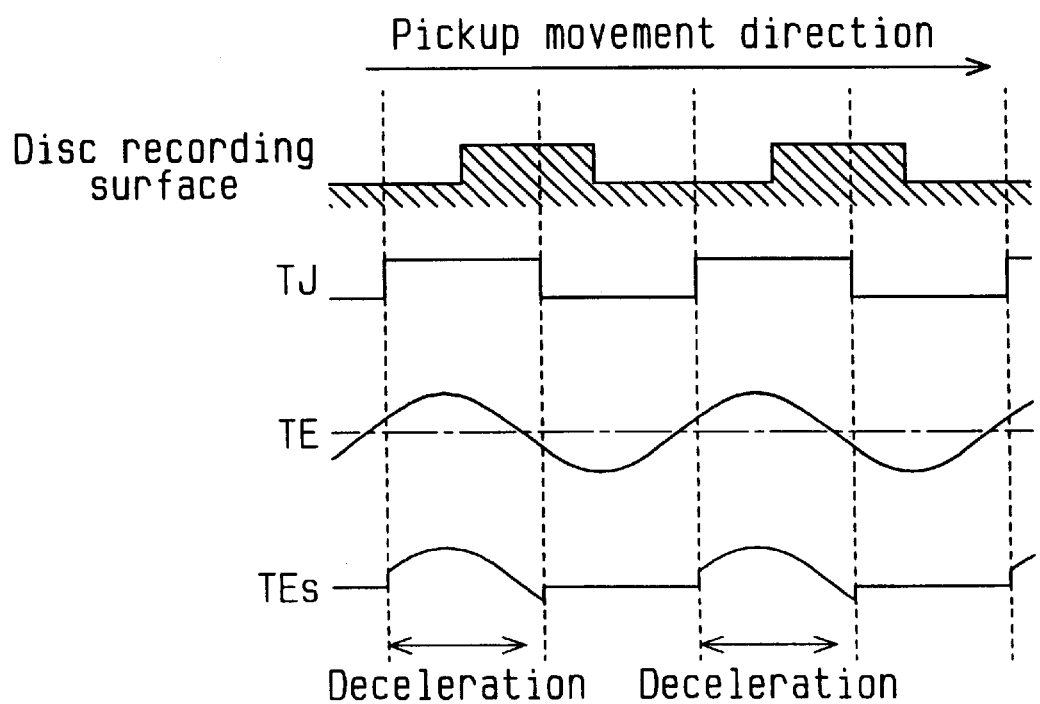
FIG. 4 is a chart showing the relationship between the movement of a pickup and the tracking error signal.
Figure 5:
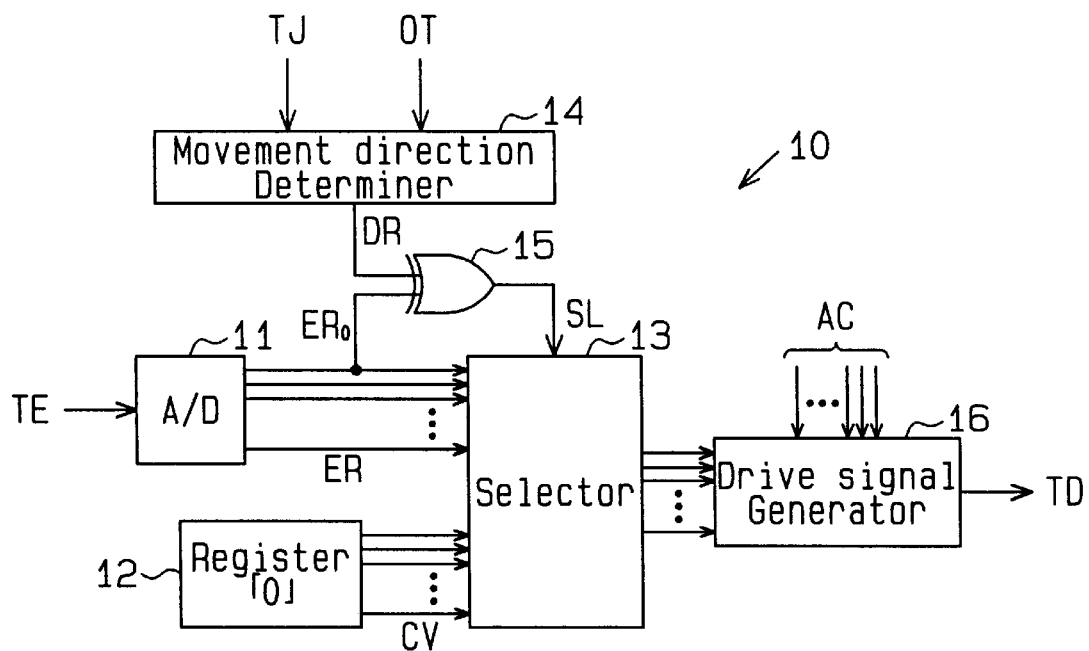
FIG. 5 is a block diagram showing a tracking servo controller according to a first embodiment of the present invention.
Figure 6:
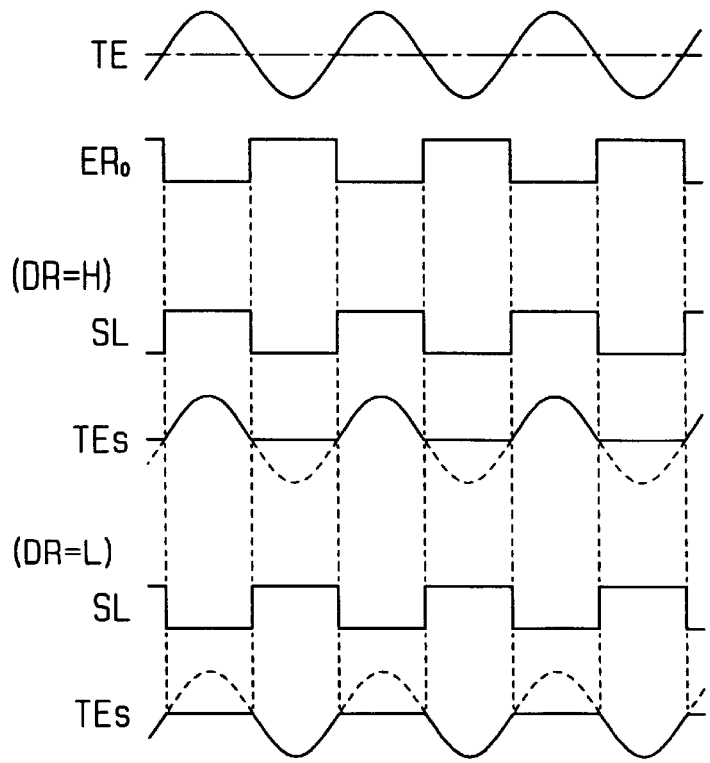
FIG. 6 is a chart showing the waveforms of each signal in the tracking servo circuit of FIG. 5.
Figure 7:
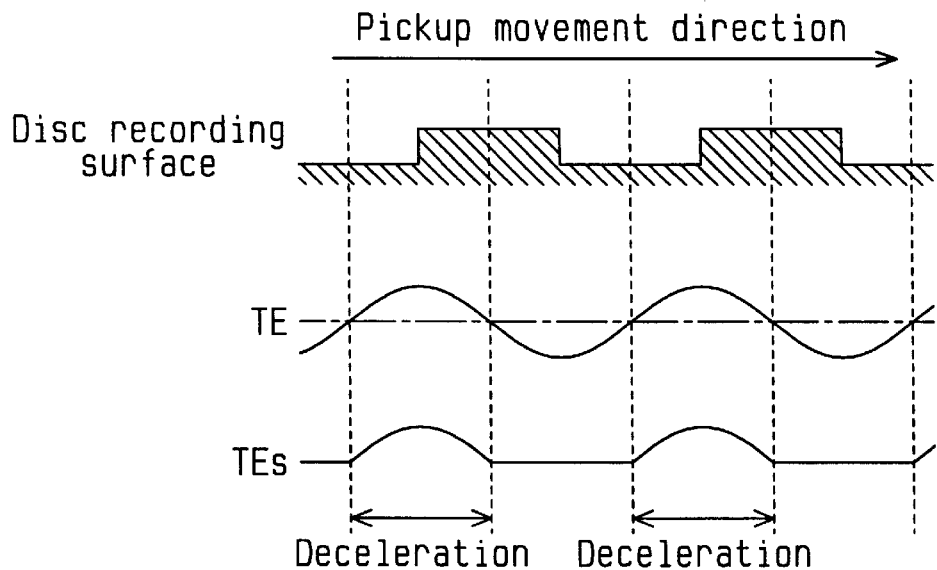
FIG. 7 is a chart showing the relationship between the movement of a pickup and a tracking error signal.

A tracking servo circuit 10 according to a first embodiment of the present invention will now be described with reference to FIGS. 5 to 7. The tracking servo circuit 10 is employed in lieu of the servo controller 6 of the conventional disc reproduction apparatus shown in FIG. 1. The tracking servo circuit 10 includes an A/D converter 11, a register 12, a selector 13, a movement direction determiner 14 functioning as a direction detector, an XOR gate 15 functioning as a selection signal generator, and a drive signal generator 16. The tracking servo circuit 10 operates in accordance with a tracking error signal TE and an off track signal OT provided by signal processors, each of which perform predetermined processes on the output of the pickup.

The A/D converter 11 generates digitized error data ER from an analog tracking error signal TE. Sampling of the tracking error signal TE is carried out by the A/D converter 11 in cycles shorter than that of the tracking error signal TE. The A/D converter 11 standardizes the sampled value and generates error data ER having an appropriate number of bits. The bit having the uppermost order in the error data (code bit $ER_0$) indicates the polarity of the tracking error signal TE. The other bits of the error data ER indicate the amplitude of the tracking error signal TE. The polarity of the tracking error signal TE is determined by the A/D converter 11 using the intermediate potential of the ground potential value and the power supply potential value as a boundary value. The intermediate potential is set such that it coincides with the threshold value used when digitizing the tracking error signal TE and generating the track jump signal TJ.

The register 12 stores fixed data CV, the number of bits of which is the same as the tracking error signal TE. The fixed data CV is the error data ER corresponding to the tracking error signal TE, for example, when the amplitude is null. The selector 13 receives the error data ER from the A/D converter 11 and the fixed data CV from the register 12. The selector 13 selects either the error data ER or the fixed data CV and sends the selected data to the drive signal generator 16. The register 12 need only fix each of the bits of the fixed data at a high level or a low level. Thus, each bit of the fixed data CV of the register 12 may be generated by a connection to a power supply potential or a ground potential.

The track jump signal TJ and the off track signal OT, which are obtained by digitizing the tracking error signal TE, are both sent to the movement direction determiner 14. The movement direction determiner 14 determines the moving direction of the pickup 3 based on the difference between the phases of the signals TJ, OT. The movement direction determiner 14 sends a direction instruction signal DR to the XOR gate 15 in accordance with the determination result of the movement direction determiner 14.

For example, if the phase of the off track signal OT is delayed from that of the track jump signal TJ by 90°, the movement direction determiner 14 determines that the pickup is moving in an outward direction of the disc. In this case, the movement direction determiner 14 causes the direction instruction signal DR to rise. On the other hand, if the phase of the off track signal OT is ahead of the track jump signal TJ by 90°, the movement direction determiner 14 determines that the pickup is moving toward the center of the disc 1. In this case, the movement direction determiner 14 causes the direction instruction signal DR to fall. The direction instruction signal DR remains the same until the pickup 3 reaches the target position. Thus, it does not matter whether the timing of the timing jump signal TJ differs from that of the tracking error signal TE.

The XOR gate 15 receives the code bit $ER_0$ of the tracking error signal TE and the direction instruction signal DR and sends its output to the selector 13 as a selection signal SL. With reference to FIG. 6, when the direction instruction signal DR is high, that is, when the pickup 3 is moved in an outward direction of the disc 1, the XOR gate 15 sends the selection signal SL, which is obtained by inverting the value of the code bit $ER_0$, to the selector 13. The fixed data CV is selected when the selection signal SL is low. In other words, the error data ER is replaced by the fixed data CV when the code bit $ER_0$ indicates negative polarity of the tracking error signal TE. Hence, the amplitude of the tracking error signal $TE_s$ for negative polarity is null. If the direction instruction signal DR is low, the XOR gate 15 sends the code bit $ER_0$ directly to the selector 13. Then, since the selector 13 selects the fixed data CV when the selection signal SL is low, the error data ER is replaced by the fixed data CV when the code bit $ER_0$ indicates positive polarity of the tracking error signal TE. Hence, the amplitude of the tracking error signal $TE_s$ for positive polarity is null. The tracking error signal $TE_s$ is formed by the digitized error data ER and the fixed data CV. The difference in the timing of the selection signal SL, which controls shifting of the selector 13, and the error data ER is caused only by the delay of the XOR gate 15. The selector 13 functions properly when the delay time of the XOR gate 15 is shorter than the sampling cycle of the A/D converter 11.

The drive signal generator 16 generates an acceleration signal in response to control data AC from a control system (not shown), which causes movement of the pickup 3. The drive signal generator 16 also generates a brake signal in response to the error data ER or fixed data CV received from the selector 13. Afterward, the drive signal generator 16 synthesizes the acceleration and brake signals to generate the drive signal TD and sends the drive signal TD to the actuator 4. The drive signal TD includes a brake signal generated by limiting the error data ER to one of the polarities in accordance with the code bit $ER_0$. Accordingly, with reference to FIG. 7, when the pickup 3 is moved radially along the disc 1, the pickup 3 is decelerated if the tracking error signal TE represents the positive polarity, that is, if the pickup 3 is located in a zone extending from a substantially midway position between two adjacent pits to the central portion of the next pit. The pickup 3 moves in the direction indicated by the arrow in FIG. 7.

It is preferable that the stopping position of the pickup 3 coincide with the center of the pits. However, if the pickup 3 stops at a position somewhat offset from the bit center, the servo controller 6 moves the pickup 3 to the pit center when the disc 1 starts to rotate.

Figure 8:
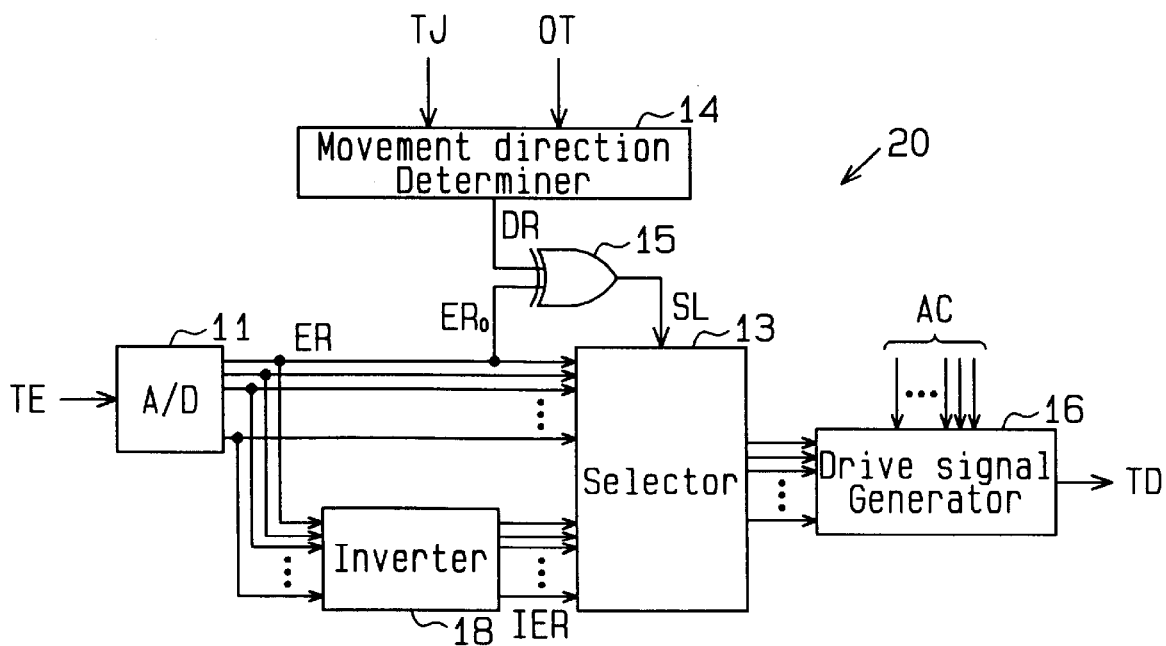
FIG. 8 is a block diagram showing a tracking servo circuit according to a second embodiment of the present invention.

A tracking servo circuit 20 according to a second embodiment of the present invention will now be described with reference to FIGS. 8 and 9. The second embodiment employs an inverter 18 in lieu of the register 12 of the first embodiment. The inverter 18 is preferably formed with a plurality of inverter circuits.

The inverter 18 receives the error data ER sent from the A/D converter 11, generates inverted error data IER by inverting each bit of the error data ER, and sends the inverted error data IER to the selector 13. The inverted error data IER is handled in the same manner as the fixed data CV illustrated in FIG. 5. That is, the selector 13 selects either the error data ER, which is received directly from the A/D converter 11, or the inverted error data IER, which is received via the inverter 18, and sends the selected data to the drive signal generator 16. The drive signal generator 16 then uses the same procedures as the first embodiment (FIG. 5) to generate the drive signal TD.

Figure 9:
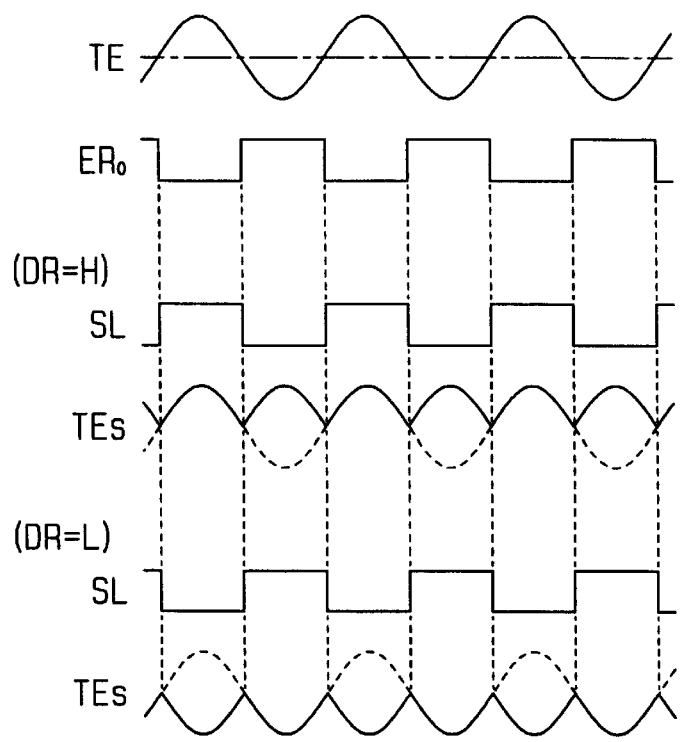
FIG. 9 is a chart showing the waveforms of each signal in the tracking servo circuit of FIG. 8.

With reference to FIG. 9, the tracking servo circuit 20 generates the selection signal SL by inverting the code bit $ER_0$ when the direction instruction signal DR is high. The error data ER is replaced by the inverted error data IER when the code bit $ER_0$ indicates negative polarity of the tracking error signal TE. This causes the tracking error signal $TE_s$ to maintain a positive value. If the direction instruction signal DR is low, the code bit $ER_0$ is used as the selection signal SL. The error data ER is replaced by the inverted error data IER when the code bit $ER_0$ indicates positive polarity of the tracking error signal TE. This causes the tracking error signal $TE_s$ to maintain a negative value. The tracking error signal $TE_s$ is formed by the digitized error data ER and inverted error data IER.

In the second embodiment, the difference between the timing of the selection control signal SL, which controls the shifting by the selector 13, and the timing of the error data ER is caused only by the delay of the XOR gate 15. Thus, the selector 13 functions properly, like in the first embodiment.

In the first embodiment, the register 12 sends the fixed data CV to the selector 13, while in the second embodiment, the inverter 18 sends the inverted error data IER to the selector 13. In the first and second embodiments, replacement data may be generated by an amplifier (which is preferably a multiplier) and sent to the selector 13 together with the error data ER. In this case, the gain of the amplifier is set at "0" to perform the same processing as the first embodiment and set at "−1" to perform the same processing as the second embodiment.

Figure 10:
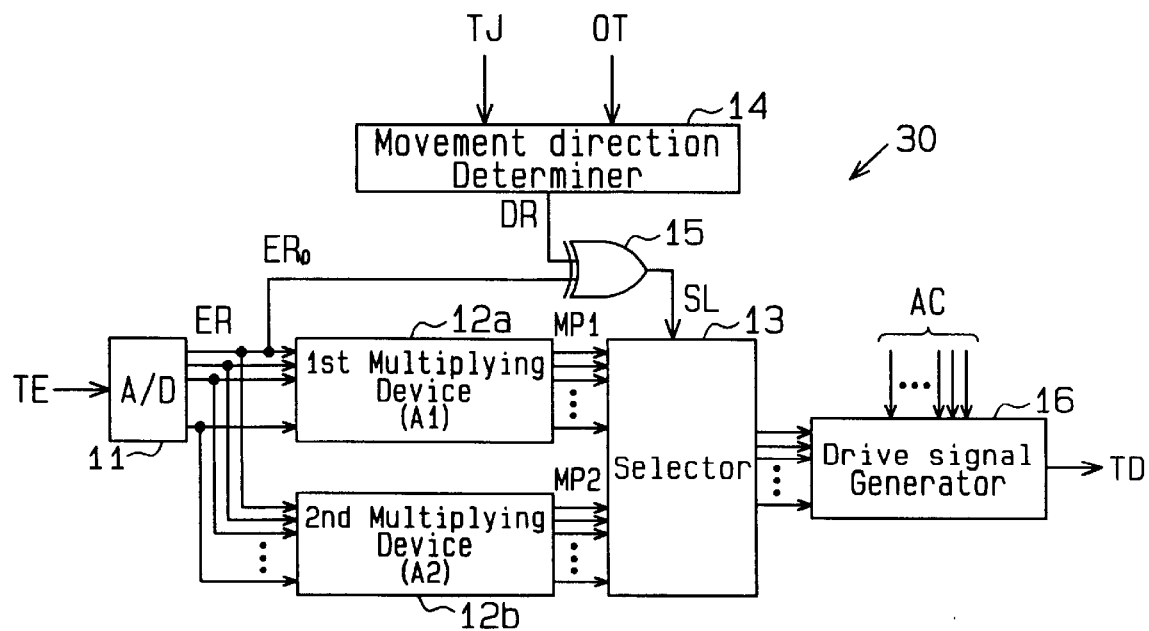
FIG. 10 is a block diagram showing a tracking servo circuit according to a third embodiment of the present invention.
Figure 11:
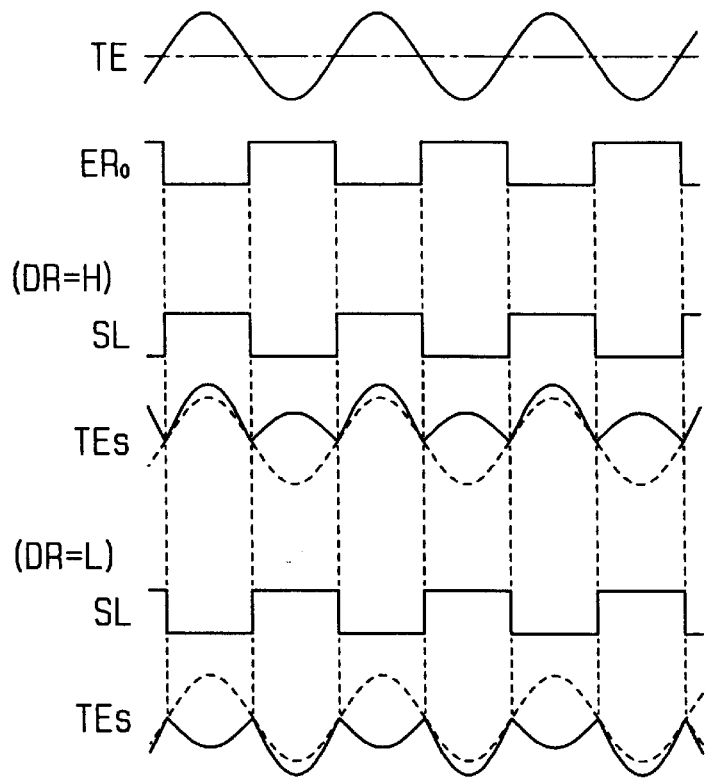
FIG. 11 is a chart showing the waveforms of each signal in the tracking servo circuit of FIG. 10.

A tracking servo circuit 30 according to a third embodiment of the present invention will now be described with reference to FIGS. 10 and 11. The description will center on those parts which differ from the first embodiment. The tracking servo circuit 30 includes a first multiplying device 12a and a second multiplying 12b which are arranged between the A/D converter 11 and the selector 13.

The first and second multiplying devices 12a, 12b are provided with first and second multipliers A1, A2, respectively. The first and second multipliers A1, A2 are set independently from each other and in accordance with the operational characteristics of the mechanism that moves the pickup. The first and second multiplying devices 12a, 12b multiply the error data ER sent from the A/D converter 11 with the first and second multipliers A1, A2 to generate first and second product data MP1, MP2, respectively. If the first multiplier A1 is set at a positive value, the second multiplier A2 is set at a negative value. Thus, the polarity of the second product data MP2 obtained from the second multiplying device 12b is inverted relative to the error data ER. The selector 13 selects one of the product data MP1 and MP2 obtained from the associated first and second multiplying devices and sends the selected data to the drive signal generator 16.

The XOR gate 15 receives the code bit $ER_0$ of the tracking error signal TE and the direction instruction signal DR and sends its output to the selector 13 as a selection signal SL. With reference to FIG. 11, when the direction instruction signal DR is high, the XOR gate 15 sends the selection signal SL, which is obtained by inverting the value of the code bit $ER_0$, to the selector 13. The selector 13 selects the first product data MP1 when the code bit $ER_0$ indicates positive polarity of the tracking error signal TE. If the code bit $ER_0$ indicates negative polarity of the tracking error signal TE, the selector 13 selects the second product data MP2. This causes the tracking error signal $TE_s$ to maintain a positive value. If the direction instruction signal DR is low, the XOR gate 15 sends the code bit $ER_0$ directly to the selector 13 as the selection signal SL. The selector 13 selects the second product data MP2 when the code bit $ER_0$ indicates positive polarity of the tracking error signal TE. As mentioned above, the polarity of the second product data MP2 is inverted relative to the error data ER. This causes the tracking error signal $TE_s$ to maintain a negative polarity. In the actual circuit, the tracking error signal $TE_s$ is formed by the digitized error data ER and the inverted error data IER.

The drive signal generator 16 generates an acceleration signal in response to control data AC from a control system (not shown), which commands the movement of the pickup 3. The drive signal generator 16 also generates a brake signal in response to the data MP1 of MP2 acquired from the selector 13. Afterward, the drive signal generator 16 synthesizes the acceleration and brake signals to generate the drive signal TD and sends the drive signal TD to the actuator 4.

Figure 12:
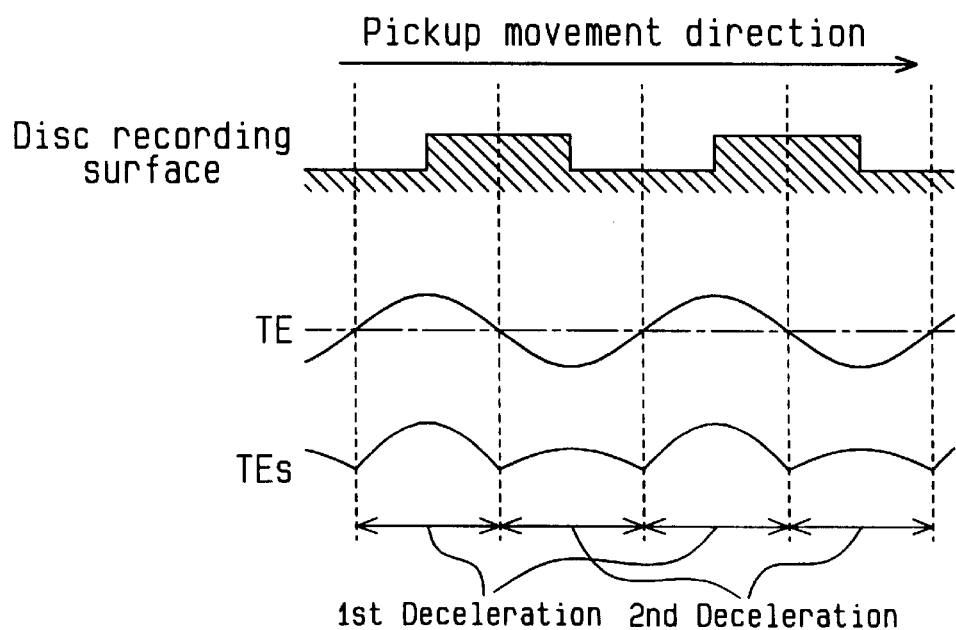
FIG. 12 is a chart showing the relationship between the movement of a pickup and a tracking error signal.

The drive signal TD includes a brake signal limited to only one of the polarities in accordance with the code bit $ER_0$. Accordingly, with reference to FIG. 12, when the pickup 3 is moved radially along the disc 1, the pickup 3 undergoes a first deceleration if the tracking signal TE represents the positive polarity, that is, if the pickup 3 is located in a zone extending from a substantially midway position between two adjacent pits to the central portion of the next pit. The pickup 3 undergoes a second deceleration if the tracking signal TE represents the negative polarity, that is, if the pickup 3 is located in a zone extending from the central portion of the next pit to a substantially midway position between the adjacent two pits. The first and second deceleration processes are determined by the first and second multipliers A1, A2 which are set by the first and second multiplying devices 12a, 12b. Accordingly, the first and second deceleration processes are independent of each other. The pickup 3 moves in the direction indicated by the arrow indicated in FIG. 12. It is preferable that the stopping position of the pickup 3 coincide with the center of the pits. However, if the pickup 3 stops at a position somewhat offset from the bit center, the servo functions to move the pickup 3 to the pit center when the disc 1 starts to rotate.

In the third embodiment, the difference between the timing of the selection control signal SL, which controls the shifting of the selector 13, and the timing of the error data ER is caused only by the delay of the XOR gate 15. Thus, the selector 13 functions properly, like in the first embodiment. Furthermore, when the pickup 3 moves radially along the disc 1, two types of deceleration processes are performed. Hence, very accurate control of the pickup 3 is performed.

In the third embodiment, deceleration processes are carried out substantially continuously during the movement of the pickup 3. However, one of the first and second multipliers A1, A2 may be set at zero. In this case, the pickup 3 may be decelerated either when the pickup 3 is located in a zone extending from a central portion of a bit to a substantially midway position between the two adjacent pits or when the pickup 3 is located in a zone extending from a substantially midway position between two adjacent pits to the central portion of the next pit.

In the first to third embodiments, one of the polarities of the tracking error signal can be acquired at an accurate timing. A braking force corresponding to the acquired tracking error signal is applied to the pickup 3 when the pickup 3 is moving radially along a disc 1. This accurately stops the pickup 3.

In the third embodiment, the braking force at two different periods are set separately from each other for fine control of the braking force. This decreases the time required for the pickup 3 to move between tracks and improves the response speed during track jumps.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A tracking servo circuit for stopping a pickup at a target position on a recording track formed on a recording medium, the tracking servo circuit comprising:
    a selection signal generator for generating a selection signal in accordance with the polarity of a tracking error signal, wherein the tracking error signal has a positive value when the pickup is located at a first side of the recording track and a negative value when located at a second, opposite side of the recording track;
    a selector connected to the selection signal generator to select one of two data in accordance with the selection signal and output the selected data;
    a drive signal generator connected to the selector to generate a drive signal for stopping the radial movement of the pickup using the selected data; and
    an A/D converter connected to the selector for generating digitized error data from the tracking error signal, wherein the error data includes a code bit indicating the polarity of the tracking signal, wherein the A/D converter is connected to the selection signal generator and the two data selected in accordance with the selection signal are the error data and a predetermined fixed data.

2. The tracking servo circuit according to claim 1, further comprising a direction detector connected to the selection signal generator for detecting the moving direction of the pickup, wherein the selection signal generator inverts the selection signal when the moving direction of the pick up changes, wherein the inversion of the selection signal switches the data selected by the selector.

3. The tracking servo circuit according to claim 2, wherein the direction detector generates a detection signal in accordance with the moving direction of the pickup and the selection signal generator inverts the selection signal in response to the detection signal.

4. The tracking servo circuit according to claim 1, further comprising a register connected to the selector to store the predetermined fixed data.

5. The tracking servo circuit according to claim 1, wherein the predetermined fixed data has a value indicative of when the amplitude of the tracking error signal is null.

6. The tracking servo circuit according to claim 1, further comprising an inverter connected to the A/D converter to receive the error data from the A/D converter and generate an inverted error data, wherein the selector is connected to the A/D converter and the two data selected in accordance with the selection signal are the error data and the inverter error data.

7. The tracking servo circuit according to claim 6, further comprising a direction detector connected to the selection signal generator for detecting the moving direction of the pickup, wherein the selection signal generator inverts the selection signal when the moving direction of the pickup changes, wherein the inversion of the selection signal switches the data selected by the selector.

8. The tracking servo circuit according to claim 7, wherein the direction detector generates a detection signal in accordance with the moving direction of the pickup and the selection signal generator inverts the selection signal in response to the detection signal.

9. The tracking servo circuit according to claim 1, further comprising:
    a first multiplying device connected to the A/D converter to receive the error data from the A/D converter, multiply the error data with a predetermined first coefficient, and generate a first product; and
    a second multiplying device connected to the A/D converter to receive the error data from the A/D converter, multiply the error data with a predetermined second coefficient, and generate a second product, wherein the selector is connected to the first and second multiplying devices and the two data selected in accordance with the selection signal are the first product and the second product.

10. The tracking servo circuit according to claim 9, wherein the first coefficient and the second coefficient have opposite polarities.

11. The tracking servo circuit according to claim 9, wherein the first coefficient has a positive polarity and the second coefficient has a negative polarity.

12. The tracking servo circuit according to claim 9, further comprising a direction detector connected to the selection signal generator for detecting the moving direction of the pickup, wherein the selection signal generator inverts the selection signal when the moving direction of the pickup changes, wherein the inversion of the selection signal switches the data selected by the selector.

13. The tracking servo circuit according to claim 12, wherein the direction detector generates a detection signal in accordance with the moving direction of the pickup and the selection signal generator inverts the selection signal in response to the detection signal.

14. A tracking servo circuit for stopping a pickup at a target position on a recording track formed on a recording medium, the tracking servo circuit comprising:
    an A/D converter for generating digitized error data from a tracking error signal, wherein the tracking error signal has a positive value when the pickup is located at a first side of the recording track and a negative value when located at a second, opposite side of the recording track, and wherein the error data includes a code bit indicating the polarity of the tracking signal;
    a selection signal generator for generating a selection signal in accordance with the code bit;
    a selector connected to the A/D converter and the selection signal generator to select one of the error data and a predetermined fixed data in accordance with the selection signal;
    a drive signal generator connected to the selector to generate a drive signal for stopping the radial movement of the pickup using the data selected by the selector;
    a direction detector connected to the selection signal generator for detecting the moving direction of the pickup and generating a detection signal; and
    a register connected to the selector to store the fixed data that has a value indicative of when the amplitude of the tracking error signal is null, wherein the selection signal generator inverts the selection signal in response to the detection signal when the moving direction of the pickup changes, wherein the inversion of the selection signal switches the data selected by the selector.

15. A tracking servo circuit for stopping a pickup at a target position on a recording track formed on a recording medium, the tracking servo circuit comprising:

an A/D converter for generating digitized error data from a tracking error signal, wherein the tracking error signal has a positive value when the pickup is located at a first side of the recording track and a negative value when located at a second, opposite side of the recording track, and wherein the error data includes a code bit indicating the polarity of the tracking signal;

a first multiplying device connected to the A/D converter to receive the error data from the A/D converter, multiply the error data with a predetermined first coefficient, and generate a first product;

a second multiplying device connected to the A/D converter to receive the error data from the A/D converter, multiply the error data with a predetermined second coefficient, and generate a second product;

a selection signal generator for generating a selection signal in accordance with the code bit;

a selector connected to the first and second multiplying devices and the selection signal generator to select one of the first product and the second product in accordance with the selection signal; and a drive signal generator connected to the selector to generate a drive signal for stopping the radial movement of the pickup using the data selected by the selector.

16. The tracking servo circuit according to claim 15, wherein the first coefficient and the second coefficient have opposite polarities.

17. The tracking servo circuit according to claim 15, further comprising a direction detector connected to the selection signal generator for detecting the moving direction of the pickup and generating a detection signal, wherein the selection signal generator inverts the selection signal in response to the detection signal when the moving direction of the pickup changes, wherein the inversion of the selection signal switches the data selected by the selector.

18. A tracking servo circuit for stopping a pickup at a target position on a recording track formed on a recording medium, the tracking servo circuit comprising:

a selection signal generator for generating a selection signal in accordance with the polarity of a tracking error signal, wherein the tracking error signal has a positive value when the pickup is located at a first side of the recording track and a negative value when located at a second, opposite side of the recording track;

a selector connected to the selection signal generator to select one of two data in accordance with the selection signal and output the selected data;

a drive signal generator connected to the selector to generate a drive signal for stopping the radial movement of the pickup using the selected data;

an A/D converter connected to the selector for generating digitized error data from the tracking error signal, wherein the error data includes a code bit indicating the polarity of the tracking signal;

an inverter connected to the A/D converter to receive the error data from the A/D converter and generate an inverted error data, wherein the selector is connected to the A/D converter and the two data selected in accordance with the selection signal are the error data and the inverted error data; and a direction detector connected to the selection signal generator for detecting the moving direction of the pickup, wherein the selection signal generator inverts the selection signal when the moving direction of the pickup changes, wherein the inversion of the selection signal switches the data selected by the selector.

19. The tracking servo circuit according to claim 18, wherein the A/D converter is connected to the selection signal generator and the two data selected in accordance with the selection signal are the error data and a predetermined fixed data.

20. The tracking servo circuit according to claim 19, further comprising a direction detector connected to the selection signal generator for detecting the moving direction of the pickup, wherein the selection signal generator inverts the selection signal when the moving direction of the pickup changes, wherein the inversion of the selected signal switches the data selected by the selector.

21. The tracking servo circuit according to claim 20, wherein the direction detector generates a detection signal in accordance with the moving direction of the pickup and the selection signal generator inverts the selection signal in response to the detection signal.

22. The tracking servo circuit according to claim 19, further comprising a register connected to the selector to store the predetermined fixed data.

23. The tracking servo circuit according to claim 19, wherein the predetermined fixed data has a value indicative of when the amplitude of the tracking error signal is null.

24. The tracking servo circuit according to claim 23, wherein the direction detector generates a detection signal in accordance with the moving direction of the pickup and the selection signal generator inverts the selection signal in response to the detection signal.

25. The tracking servo circuit according to claim 18, further comprising:

a first multiplying device connected to the A/D converter to receive the error data from the A/D converter, multiply the error data with a predetermined first coefficient, and generate a first product; and a second multiplying device connected to the A/D converter to receive the error data from the A/D converter, multiply the error data with a predetermined second coefficient, and generate a second product, wherein the selector is connected to the first and second multiplying devices and the two data selected in accordance with the selection signal are the first product and the second product.

26. The tracking servo circuit according to claim 25, wherein the first coefficient and the second coefficient have opposite polarities.

27. The tracking servo circuit according to claim 25, wherein the first coefficient has a positive polarity and the second coefficient has a negative polarity.

28. The tracking servo circuit according to claim 25, further comprising a direction detector connected to the selection signal generator for detecting the moving direction of the pickup, wherein the selection signal generator inverts the selection signal when the moving direction of the pickup changes, wherein the inversion of the selection signal switches the data selected by the selector.

29. The tracking servo circuit according to claim 28, wherein the direction detector generates a detection signal in accordance with the moving direction of the pickup and the selection signal generator inverts the selection signal in response to the detection signal.

* * * * *